(No Model.)

S. G. HODGES.
WHEEL

No. 467,252. Patented Jan. 19, 1892.

WITNESSES:
F. R. Cornwall
Reuv Lewis

INVENTOR
Schuyler G. Hodges
BY L. S. Bacon
ATTORNEY.

UNITED STATES PATENT OFFICE.

SCHUYLER G. HODGES, OF PONTIAC, ASSIGNOR TO THE ACME SAFETY EMERY WHEEL COMPANY, OF DETROIT, MICHIGAN.

WHEEL.

SPECIFICATION forming part of Letters Patent No. 467,252, dated January 19, 1892.

Application filed June 3, 1891. Serial No. 394,905. (No model.)

*To all whom it may concern:*

Be it known that I, SCHUYLER G. HODGES, a citizen of the United States, residing at Pontiac, in the county of Oakland and State of Michigan, have invented certain new and useful Improvements in Wheels; and I do hereby declare the following to be a full, clear, and exact description of the invention, such as will enable others skilled in the art to which it appertains to make and use the same.

This invention relates to an improvement in wheels; and it consists in the certain peculiar features of construction and arrangement of parts, hereinafter described, and definitely pointed out in the claims.

The object of my invention is to provide a solid, durable, and inexpensive hub for wheels intended to be used for any desired purpose, and which may be utilized after the web of the wheel is worn out or damaged. I attain this object by the construction illustrated in the accompanying drawings, wherein like letters of reference indicate like parts in the several views, and in which—

Figure 1:
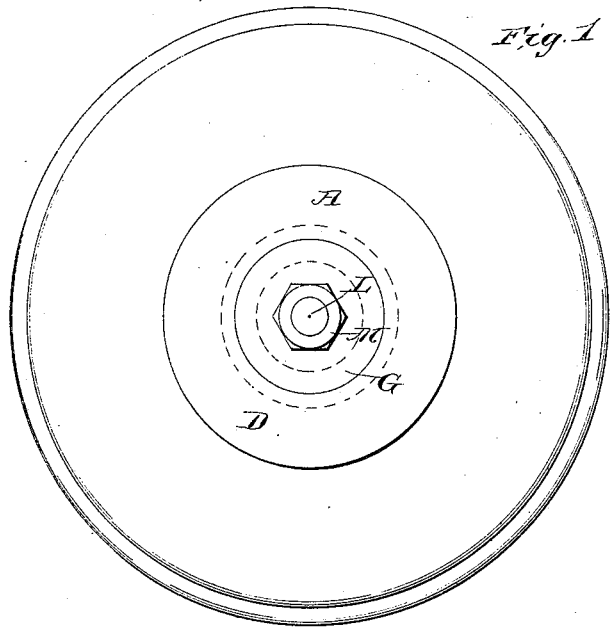
Figure 2:
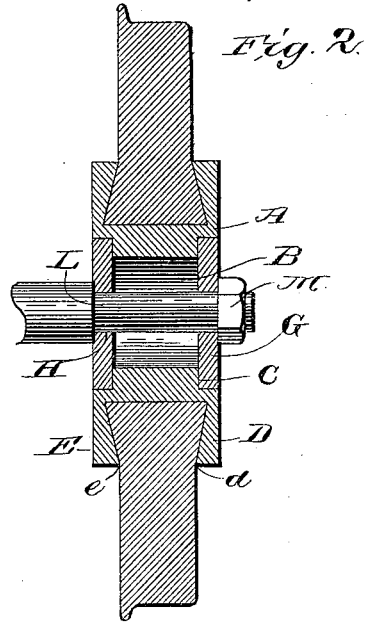
Figure 3:
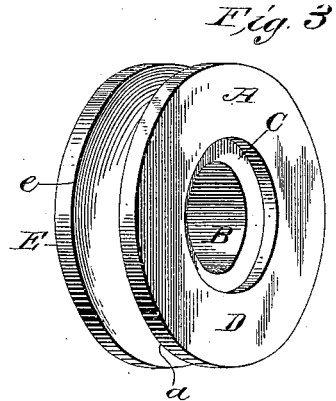
Figure 4:
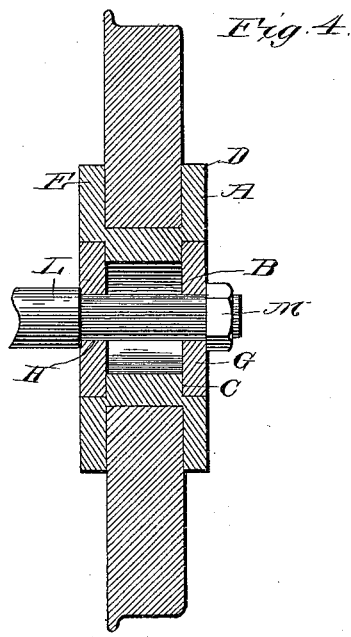

Figure 1 is a side elevation of a wheel embodying my improved hub. Fig. 2 is a vertical section through the center thereof. Fig. 3 is a perspective view of a hub, and Fig. 4 is a modified form of hub.

In the drawings, A represents the hub, which is formed in one continuous solid casting, having a central opening B, which terminates in circular recess C, formed in the side of the hub, and extending part way to the outer edge thereof. The outer edges of the hub have integral radial flanges D E thereon, extending entirely around the same, which have shoulders or projections *d e* on their inner faces near their outer edges. These shoulders may be formed by inclining the inner faces of the flanges from the top outward and downward, or they may be formed with rightangle projections, as shown, whichever may be desired. The location of the flanges on the outer edges of the hub forms a continuous circumferential dovetail or rectangular groove between, into which the material to form the web F of the wheel is molded or pressed in any suitable manner, the shoulders being means for securely retaining the material in the groove.

G represents side bearing-disks formed of circular metal plates of a diameter and thickness corresponding to the size of the recesses C, in which they closely fit. These disks are formed with central openings H, of a diameter less than that of the opening B, and through which the shaft L passes, the disks forming the bearings for the shaft.

To retain the disks in their seats in the recesses, suitable nuts M are placed on the shaft, which is suitably threaded, or one of the nuts may be shrunk or cast on the shaft. These nuts are forced tightly against the disks to bind the latter against the hubs.

By the above construction a very strong and durable wheel is formed, the hub furnishing a rigid and primary seat for the web. When the web or outer portion of the wheel becomes broken, bent, or in any other way damaged or worn, it is only necessary to remove the plates from the hubs, and the remaining portion, including the web and hub, may be returned to the factory for repairs and a new web fitted in between the flanges; and, again, should the bearings become worn it is only necessary to replace the disks. By forming the openings in the disks of less diameter than the opening in the hub, the hub is prevented from becoming heated, and all wear is taken therefrom.

I am aware that many minor changes in the construction and arrangement of the parts of my device can be made and substituted for those herein shown and described without in the least departing from the nature and principle of my invention.

Having thus described my invention, what I claim as new, and desire to secure by Letters Patent, is—

1. In a wheel, a hub formed of a single piece of material having peripheral flanges on its outer edges forming a continuous circumferential groove between, a web molded into said groove, and independent bearing-plates on the hub, substantially as described.

2. In a wheel, a single-piece hub having a circumferential dovetail groove therein, a web molded into said groove, and detachable bearings for the hub, substantially as described.

3. In a wheel, a hub formed of a single piece of metal having a circumferential groove therein, projections on the hub extending into the groove, a central opening and side recesses formed in the hub, and removable bearing-plates in the recesses formed with central openings of a diameter less than the opening in the hub, substantially as described.

In testimony whereof I affix my signature in presence of two witnesses.

SCHUYLER G. HODGES.

Witnesses:
HERMAN NAGLE,
G. F. D. WILSON.